Sept. 18, 1928.
S. G. VAN DERBECK
1,685,037
WINDSHIELD WIPER
Filed Feb. 8, 1926    2 Sheets-Sheet 1
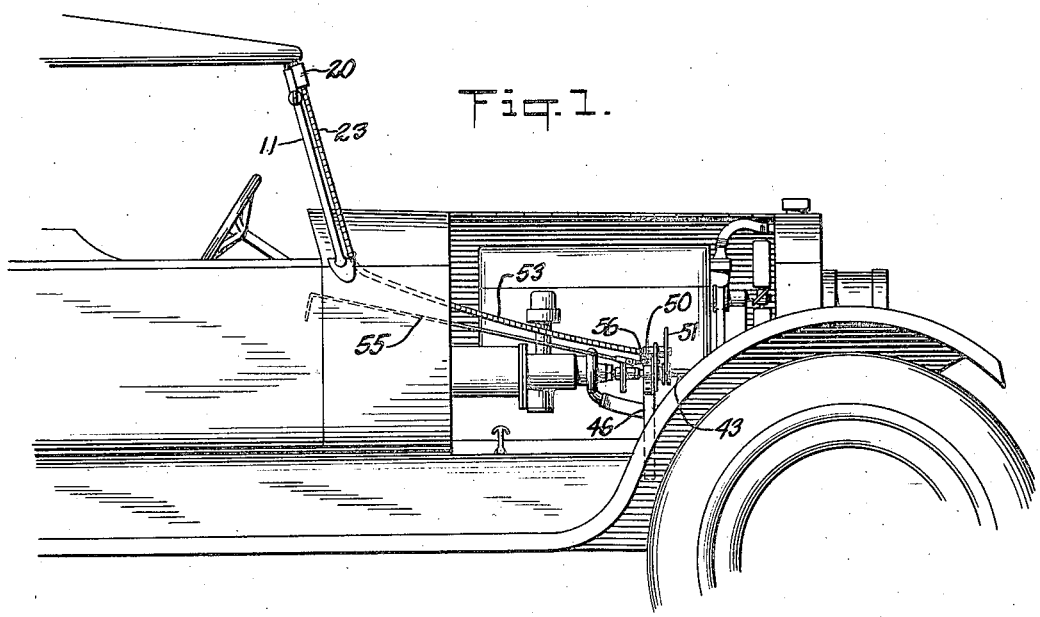
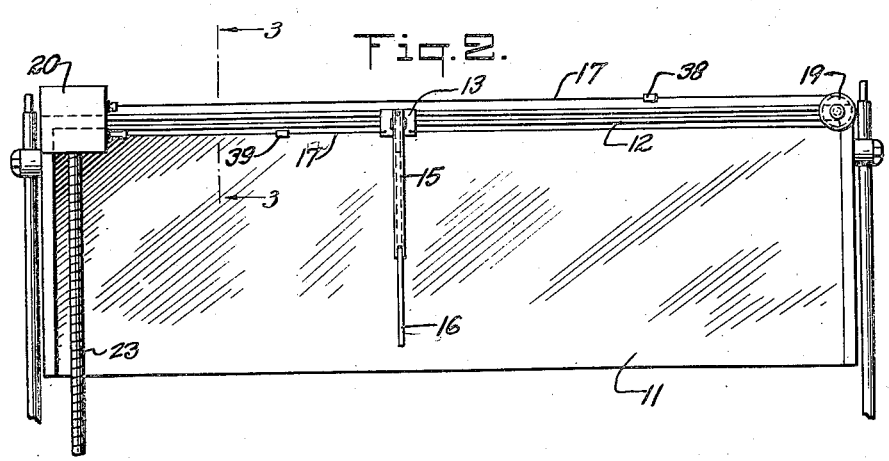
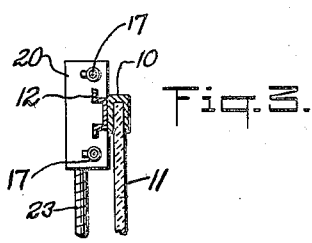
INVENTOR
Stephen G. Van Derbeck
BY
Emanuel Scheyer
ATTORNEY

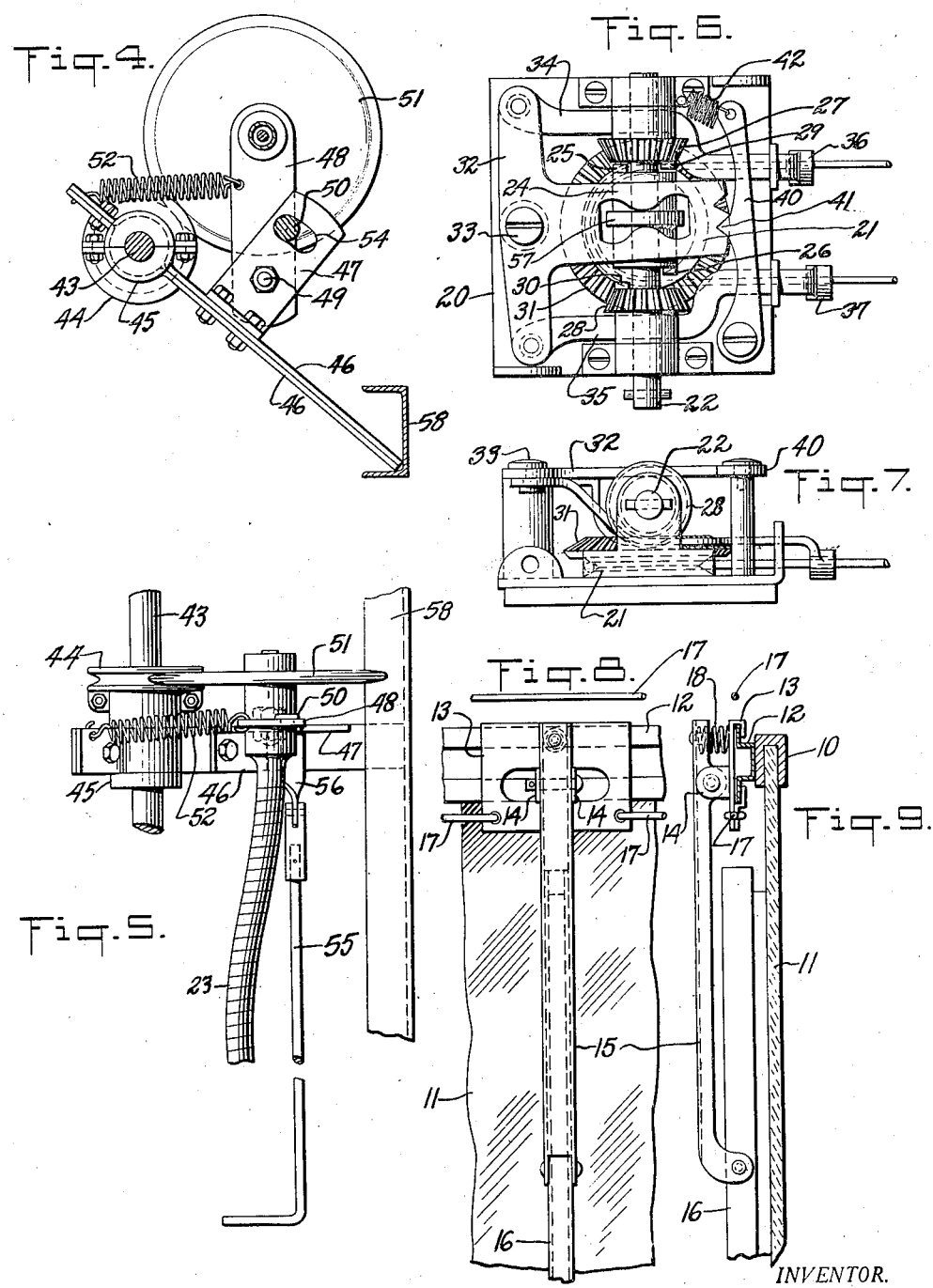

Patented Sept. 18, 1928.

1,685,037

UNITED STATES PATENT OFFICE.

STEPHEN G. VAN DERBECK, OF HACKENSACK, NEW JERSEY.

WINDSHIELD WIPER.

Application filed February 8, 1926. Serial No. 86,854.

This invention relates to wind-shield wipers and has for its main object the production of a wind-shield wiper, automatic in operation and under the control of the driver.

It is well known that in rainy or stormy weather, the transparent wind-shields of automobiles, trolley cars, locomotives and the like are apt to become covered with moisture, sleet or snow, thereby preventing the driver from obtaining a clear view of the road.

One of the objects of this invention is to provide a cleaner, capable of being set in motion at the will of the driver and having a "squeegee" or other suitable cleaning tool, movable across the outer surface of the windshield glass and operatively connected with some rotary portion of the vehicle, such as the shaft of the water pump, in such manner that the rotary motion is converted into a reciprocatory motion of the cleaning tool, thereby causing it to travel across the face of the glass, whereby the accumulated matter is readily removed. The motion of the wiper is one of pure translation, whereby there is equal travel for all parts of the wiper across the glass, resulting in equal cleaning for the length of the wiper. This is an advantage over rotary cleaners, in that with said cleaners, the part of the tool nearest its axis of rotation, usually just the part required to be left clean the most, is given a much smaller travel than the portion of the tool nearest its outer end. A further advantage of my construction lies in the fact that the region of travel of the wiper can be adjusted to suit the driver. Still another advantage is its ready adaptability to be installed in a vehicle. A simple friction means is provided whereby it can be driven from a rotating part of the vehicle, such as the water pump shaft. The wiper itself is caused to press against the glass of the shield by a novel construction. A separate spring is used under the heel of the wiper lever for causing pressure against the glass, rather than depending upon the flexibility of this lever to bring about the pressure. This lends itself to ready adjustability of the pressure.

Other objects and advantages will become apparent upon a further reading of the description and the drawings in which:—

Fig. 1 is a view of a motor vehicle, with the hood open, showing the wiper in place with its driving connection to the water pump, Fig. 2 is a front view of the windshield with the wiper and its operating mechanism mounted thereon, Fig. 3 is a section along the line 3—3 of Fig. 2, Fig. 4 is an elevation of the friction drive, Fig. 5 is a plan view of said drive, Fig. 6 is a front elevation of the clutch-box with the protecting casing removed, Fig. 7 is a bottom view of said box, Fig. 8 is an enlarged front view of the wiper mounting and Fig. 9 is a side view of same.

Attached to the usual metallic bead 10 at the top of the glass windshield 11 (Figs. 3 and 9) is a guide-rail 12. Channel carriage 13 is slidably mounted on rail 12. Projecting from carriage 13 are bearings 14, between which is pivotally mounted wiper lever 15. Wiper 16 is pivotally mounted upon the lower end of wiper lever 15. A spring 18 is located between the heel of wiper lever 15 and the face of carriage 13, said spring normally pressing the heel of said lever outwardly, causing wiper 16 to press against glass 11.

The ends of cable 17 are attached to the sides of carriage 13 near its lower edge. At one side of the wind-shield, cable 17 passes over idler pulley 19. At the other side, cable 17 passes around driving pulley 21 (Figs. 6 and 7) located in clutch-box 20. It is the running of cable 17 back and forth that gives wiper 16 its motion of translation. Cable 17 with its ends connected to carriage 13 is in effect an endless belt.

The mechanism for actuating driving pulley 21 is as follows:—Attached to shaft 22, which is rotatably mounted in clutch-box 20, is the flexible shaft 23. The actual connection of flexible shaft 23 to shaft 22 is not shown in Figs. 6 and 7, but can be readily understood from Fig. 2. Whenever it is desired to have the wiper in operation, flexible shaft 23, as will be explained, is caused to run shaft 22. Feathered to shaft 22 is a clutch sleeve 24. A collar 57 is centrally located on sleeve 24. From the ends of said sleeve, clutch pins 25 and 26 project. Bevel gears 27 and 28 are loosely mounted on shaft 22. Bevel gear 27 is provided with a clutch pin 29 in the path of pin 25, while bevel gear 28 is provided with a clutch pin 30 in the path of pin 26. Depending upon the position of sleeve 24, shaft 22 is caused to drive bevel gear 27 or bevel gear 28. Bevel gear 31 meshes with both bevel gears 27 and 28. The rotation of bevel gear 31 is adapted to be caused in one direction when bevel gear 27 is engaged by sleeve 24 and in the opposite direction when gear 28 is engaged. Fixed to the back of bevel gear 31 is driving pulley 21. Sleeve 24 is shifted from one position to another along shaft 22, by the engagement of the stem of rock lever 32 with collar 57. Rock lever 32 is pivotally mounted on pin 33. One end of rock lever 32 carries, pin connected to it, a link 34 which projects outside of clutch-box 20. The outer end of link 34 is provided with a sleeve 36 through which cable 17 passes on its way around driving pulley 21. In a similar manner link 35 is fastened to the other end of rock lever 32. Cable 17 passes through sleeve 37 on the end of link 35. Cable 17 carries mounted upon it adjustably locatable stops 38 and 39. As the upper run of said cable moves to the left (Fig. 2) stop 38 comes against sleeve 36 and shoves it to the left. In a similar manner when the lower run of cable 17 moves to the left sufficiently, stop 39 shoves sleeve 37 to the left. Pawl 40 is pivotally mounted in clutch-box 20 opposite the notched stem of rock lever 32. Pawl 40 has a V shaped dog 41 near its center adapted to engage either of the notches in the stem of rock lever 32. Pawl 40 is normally held towards said stem by spring 42.

With rock lever 32 in the position shown in Fig. 6 when stop 39 comes against sleeve 37, link 35 is pushed to the left. This push is partially resisted by spring 42 holding down dog 41 in the lower notch of the rock lever stem, until pawl 40 is pushed back sufficiently when rock lever 32 snaps over carrying sleeve 24 down so that clutch pin 26 is in the path of clutch pin 30, thereby driving bevel gear 28 and causing the upper run of cable 17 to move to the left. Dog 41 is then in engagement with the upper notch of said rock lever stem, locking said rock lever so as to hold sleeve 24 in its lower position. Cable 17 then continues to run until stop 38 comes against sleeve 36, snapping sleeve 24 upward, in which position it is locked by dog 41. This causes sleeve 24, by the engagement of clutch pins 25 and 29, to drive bevel gear 27, resulting in reversal of motion of cable 17 causing its lower run now to move to the left. This back and forth motion continues as long as the operator permits flexible shaft 23 to be rotated. With cable 17, wiper 16 is moved back and forth over glass 11. By varying the location of stops 38 and 39 on cable 17, wiper 16 can be given different lengths of travel and the region or zone of travel can be shifted to different portions of the windshield.

Flexible shaft 23 is driven from the shaft 43 of the water pump as follows:—The drive mechanism is readily attached to an automobile. A split pulley 44, provided with an elongated hub 45, is bolted to shaft 43. Hub 45 has a groove turned in it at an intermediate portion, in which the curved portions of bars 46 are set. Bars 46 are bolted in the groove of hub 45 so that they are loosely mounted upon said hub. The lower end of bars 46 are set against the chassis frame 58 to prevent their rotation. An angle bracket 47 is bolted to bars 46. Link 48 is pivotally mounted at 49 upon bracket 47. The upper end of link 48 carries fiber wheel 51 rotatably mounted upon it. Spring 52, fastened at one end to bars 46 and at the other to link 48, normally pulls wheel 51 against pulley 44, thereby driving the former. Link 48 has an eccentric 50 rotatably mounted upon it and engaging slot 54 in bracket 47. When eccentric 50 is so rotated as to have its eccentric portion to the left (Fig. 4), link 48 is pulled away from shaft 43 and wheel 51 separated from pulley 43 against the tension of spring 52. Eccentric 50 is rotated from the driver's seat by means of rod 55 (Figs. 1 and 5). Link 56 is pin connected to rod 55 and in a slot in the rear of eccentric 50. Pushing or pulling on rod 55 rotates eccentric 50 and controls the engagement of wheel 51 with pulley 44.

I claim:—

1. Operating means for a windshield wiper comprising a carriage adapted to traverse the windshield in opposite directions, an endless flexible actuating member for moving said carriage adapted to run substantially transversely and parallel to the surface of the windshield and having a run fixed to said carriage, power actuated means for driving said member adapted to have its direction of drive reversed, mechanism connected to said power means adapted to be set in different positions for causing said power means to reverse its direction of drive, and means fastened separately to each run of said member adapted successively to engage said mechanism for setting it in said different positions.

2. Operating means for a windshield wiper comprising a carriage adapted to traverse the windshield in opposite directions, an endless flexible actuating member for moving said carriage adapted to run substantially transversely and parallel to the surface of the windshield and having a run fixed to said carriage, power actuated clutch mechanism for driving said member in reversible directions, means connected to said clutch mechanism for effecting setting of said clutch mechanism for driving said member in reversible directions, a stop fastened to one run of said member, another stop fastened to the other run of said member, each of said stops adapted to be brought by said member successively into engagement with said clutch setting means for effecting successively the reversal of the direction of drive of said clutch mechanism as they are brought into said engagement.

3. Reversing mechanism for a windshield wiper comprising an endless flexible member adapted to run substantially transversely and parallel to a windshield, power driven clutch mechanism for driving said member in reversible directions, means connected to said clutch mechanism for effecting the settings of said clutch mechanism for driving said member in reversible directions, a stop adjustably locatable on one run of said member, another stop adjustably locatable on the other run of said member, each of said stops adapted to be brought successively into engagement by said member with said clutch setting means for effecting successively the reversal of the direction of drive of said clutch mechanism as they are brought into said engagement, the location of said stops on said runs determining the interval between reversals of said member, whereby the traverse of said member may be varied.

4. Operating means for a windshield wiper comprising a carriage adapted to traverse the windshield in opposite directions, an endless flexible actuating member for moving said carriage adapted to run substantially transversely and parallel to the surface of the windshield and having a run fixed to said carriage, a driving pulley for said actuating member over which said member runs, power driven clutch mechanism operatively connected to said pulley for driving said pulley in reversible directions, means connected to said clutch mechanism for varying the connection of said clutch mechanism to said pulley for effecting said reversal of direction, and means, carried by said member into contact with said means for varying the connection of the clutch mechanism to the pulley, actuating said latter means to vary the connection between said clutch mechanism and the pulley.

5. Operating means for a windshield wiper comprising a carriage adapted to traverse the windshield in opposite directions, an endless flexible actuating member for moving said carriage adapted to run substantially transversely and parallel to the surface of the windshield and having a run fixed to said carriage, power driven clutch mechanism for driving said member, a pivotally mounted rock-lever adapted when tilted in one direction to throw a portion of the clutch mechanism into position for driving said member in one direction and when tilted in the opposite direction to cause said member to be driven in the opposite direction, and stop mechanism carried along by the runs of said member adapted to tilt said lever into one position or the other as said carriage reaches the right or left end of its traverse.

6. Operating means for a windshield wiper comprising a carriage adapted to traverse the windshield in opposite directions, an endless flexible actuating member adapted to run substantially transversely and parallel to the surface of the windshield and fastened to said carriage for effecting its traverse, power driven clutch mechanism for driving said member, a pivotally mounted rock-lever adapted when tilted in one direction to throw a portion of the clutch mechanism into position for driving said member in one direction and when tilted in the opposite direction to cause said member to be driven in the opposite direction, a link pivotally fastened at one end to each end of said lever, the other or free ends of said links coming substantially adjacent to the upper and lower runs respectively of said member, a stop fastened to each run adapted to push the free end of its respective link for tilting said lever into one position or the other as said carriage reaches the right or left end of its traverse.

7. Operating means for a windshield wiper as claimed in claim 5 having a spring actuated pawl adapted to engage said rock lever and retain it under spring pressure in each of its tilted positions.

8. Operating means for a windshield wiper comprising a carriage adapted to traverse the windshield in opposite directions, an endless flexible actuating member for moving said carriage adapted to run substantially transversely and parallel to the surface of the windshield and having one run fastened to said carriage, a shaft adapted to be power driven, a clutch sleeve feathered to said shaft and slidable axially thereon, means for driving said member adapted when said clutch sleeve is moved into one position on said shaft to drive said member in one direction, and when the clutch sleeve is moved into the opposite position on said shaft to drive said member in the opposite direction, a pivotally mounted rock lever having a stem adapted to engage said sleeve for shifting it, and stop mechanism carried by said member adapted to rock said lever into one position or the other for shifting said clutch sleeve into its driving positions on said shaft as said carriage reaches the right and left ends of its traverse.

Signed at New York, in the county of New York and State of New York this 2nd day of February, A. D. 1926.

STEPHEN G. VAN DERBECK.